(12) United States Patent
Dror et al.

(10) Patent No.: US 12,744,715 B2
(45) Date of Patent: Sep. 22, 2026

(54) STREAMING TELEMETRY DATA FROM NETWORK DEVICE TO REMOTE COLLECTOR

(71) Applicant: Marvell Israel (M.I.S.L) Ltd., Yokneam (IL)

(72) Inventors: Nitzan Dror, Ramot Hashavim (IL); Roman Nos, Petah Tikva (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 18/818,092

(22) Filed: Aug. 28, 2024

(65) Prior Publication Data

US 2025/0097129 A1 Mar. 20, 2025

Related U.S. Application Data

(60) Provisional application No. 63/538,796, filed on Sep. 15, 2023.

(51) Int. Cl.
*H04L 43/16* (2022.01)
*H04L 43/065* (2022.01)
*H04L 43/12* (2022.01)

(52) U.S. Cl.
CPC ............ *H04L 43/065* (2013.01); *H04L 43/12* (2013.01); *H04L 43/16* (2013.01)

(58) Field of Classification Search
CPC . H04L 43/065; H04L 43/067; H04L 43/0805; H04L 43/0811; H04L 43/0835; H04L 43/0894; H04L 43/091; H04L 43/16; H04L 43/12; H04L 43/0817; H04L 45/60
USPC .......................................... 709/220, 224–228
See application file for complete search history.

(56) References Cited

U.S. PATENT DOCUMENTS 8,582,428 B1 11/2013 Bishara et al.
9,935,854 B2 * 4/2018 Kuan .................... H04L 43/065
10,506,044 B1 12/2019 Volpe et al.
10,623,285 B1 * 4/2020 Shevade ............. H04L 41/0654
11,218,411 B2 1/2022 Katan et al.
11,418,420 B2 * 8/2022 Sivaraman ............ H04L 43/067
11,438,211 B1 9/2022 Lyubomirsky et al.
11,477,288 B1 10/2022 Singh et al.
11,483,229 B1 * 10/2022 Friman ................. H04L 43/106
(Continued)

FOREIGN PATENT DOCUMENTS

AU 2014218366 A1 * 4/2015 ............. A61B 17/29
CA 3148517 A1 * 2/2021 ......... H04L 41/0896
WO 2024227123 A1 10/2024

OTHER PUBLICATIONS

International Search Report and Written Opinion for PCT No. PCT/IB2024/058374, mailed Dec. 5, 2025. (15 pages).

*Primary Examiner* — Khanh Q Dinh

(57) ABSTRACT

Hardware circuitry of a network device in a communication network collects telemetry data generated by the network device, the telemetry data providing information regarding operational status of at least one of i) the network device, and ii) one or more network links connected to the network device. The hardware circuitry generates packets that include respective sets of the telemetry data collected by the hardware circuitry. The packets are addressed to a remote network device in, or communicatively coupled to, the communication network. The hardware circuitry prompts the network device to transmit the packets to the remote network device.

20 Claims, 4 Drawing Sheets

(56) References Cited

U.S. PATENT DOCUMENTS

| | | | | |
|---|---|---|---|---|
| 11,706,103 | B2 * | 7/2023 | Huang | H04L 12/66 709/220 |
| 2008/0052394 | A1 * | 2/2008 | Bugenhagen | H04L 45/123 709/224 |
| 2008/0269841 | A1 * | 10/2008 | Grevious | H03F 3/393 607/60 |
| 2017/0346714 | A1 | 11/2017 | Mizrahi | |
| 2019/0036779 | A1 * | 1/2019 | Bajaj | H04L 43/12 |
| 2019/0182127 | A1 * | 6/2019 | Pignataro | H04L 41/5025 |
| 2019/0253250 | A1 * | 8/2019 | Bruner | G06F 21/445 |
| 2021/0250265 | A1 * | 8/2021 | Kotadia | H04L 67/1001 |
| 2021/0266264 | A1 | 8/2021 | Mizrahi et al. | |
| 2021/0318666 | A1 * | 10/2021 | Brockhurst | G06N 5/025 |
| 2021/0409221 | A1 * | 12/2021 | Leong | H04L 63/102 |
| 2022/0121078 | A1 * | 4/2022 | Vollen | G05B 11/01 |
| 2022/0210087 | A1 | 6/2022 | Biradar et al. | |
| 2022/0239571 | A1 | 7/2022 | Rangarajan et al. | |
| 2022/0255817 | A1 * | 8/2022 | Hong | G06N 20/00 |
| 2023/0096238 | A1 | 3/2023 | Hofman-bang et al. | |
| 2023/0169019 | A1 * | 6/2023 | Cannata | G06F 13/102 710/105 |

* cited by examiner

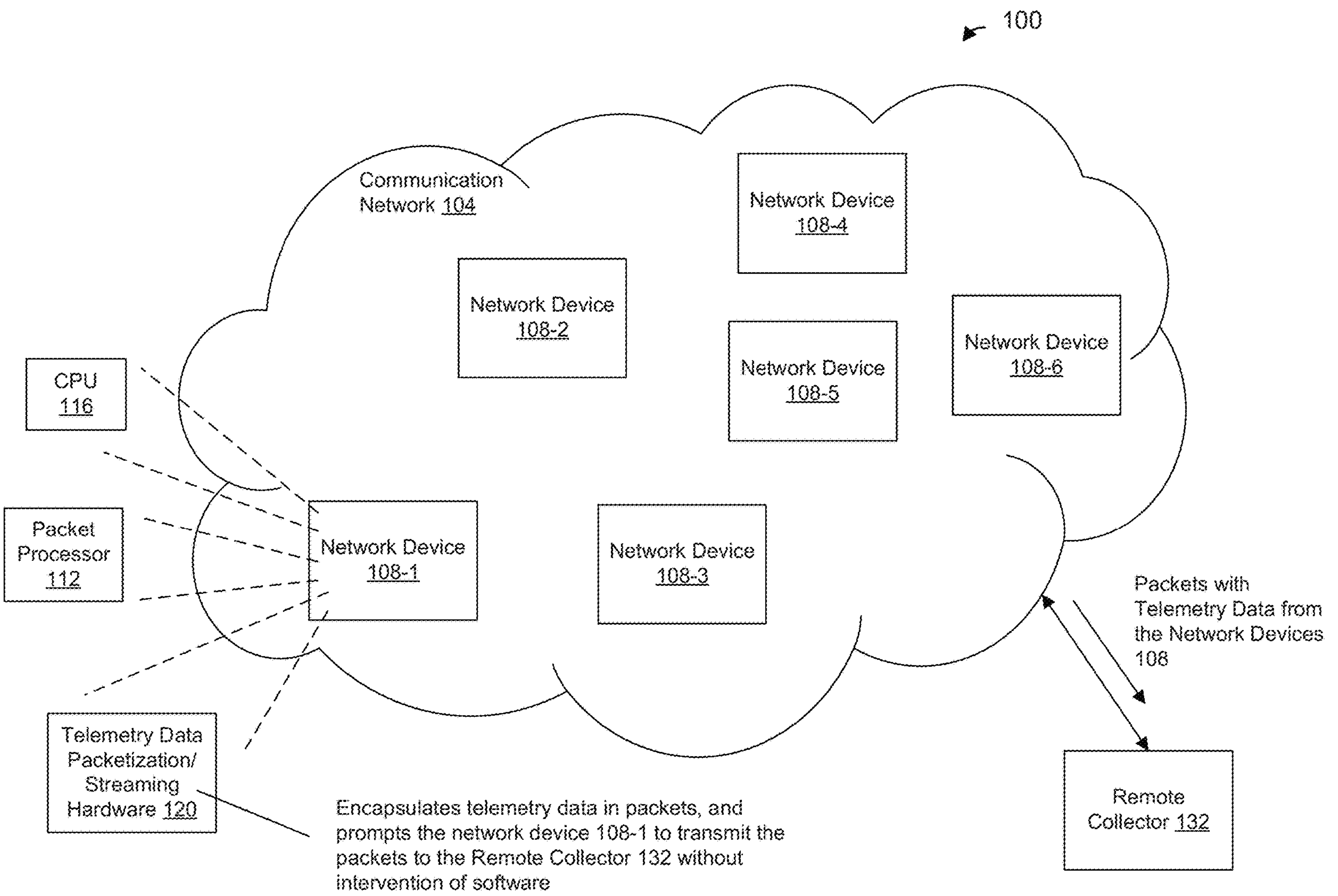
FIG. 1
100
Communication Network 104
Network Device 108-4
Network Device 108-2
Network Device 108-5
Network Device 108-6
CPU 116
Packet Processor 112
Network Device 108-1
Network Device 108-3
Packets with Telemetry Data from the Network Devices 108
Telemetry Data Packetization/ Streaming Hardware 120
Encapsulates telemetry data in packets, and prompts the network device 108-1 to transmit the packets to the Remote Collector 132 without intervention of software
Remote Collector 132

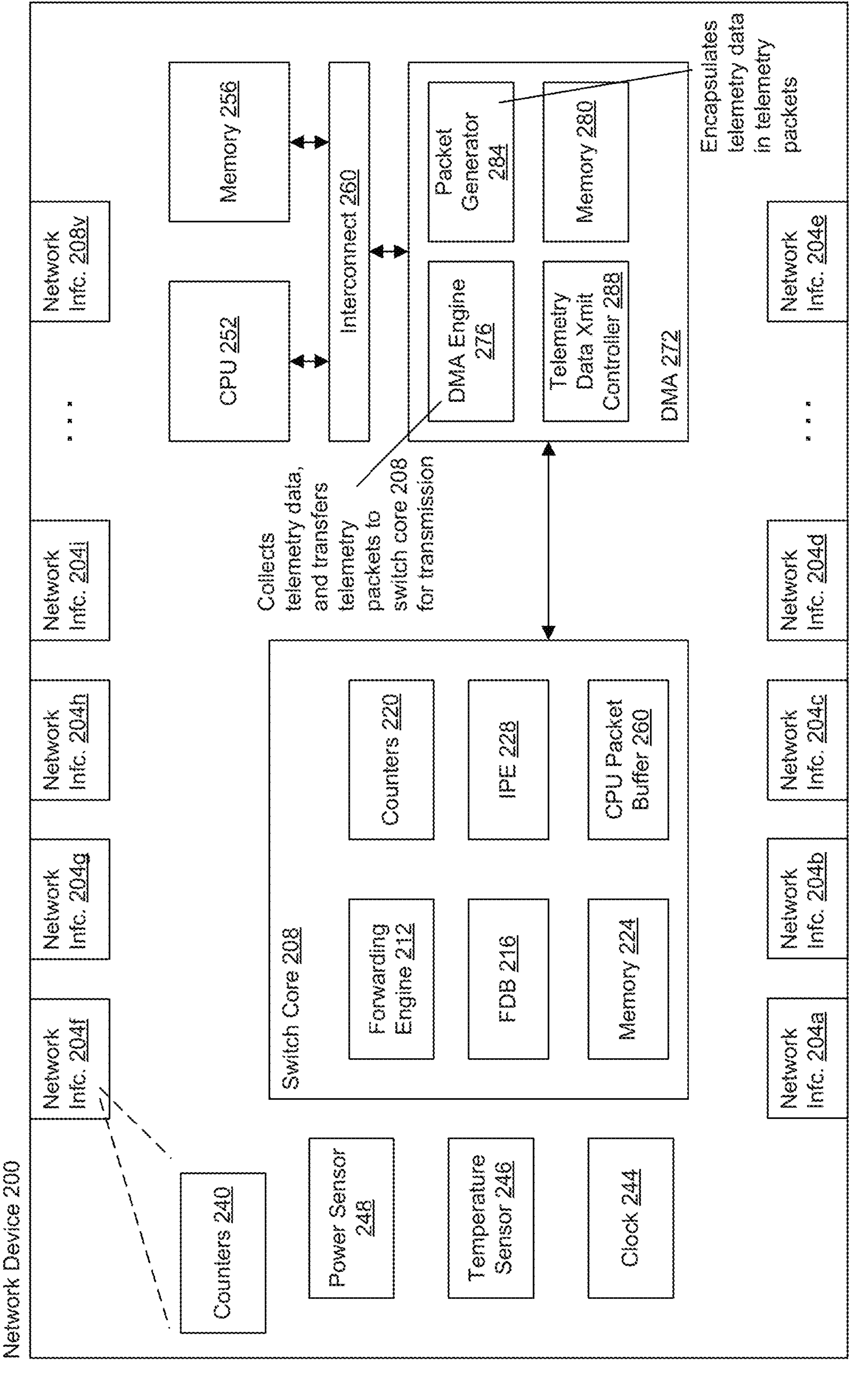
FIG. 2
Network Device 200
Counters 240
Power Sensor 248
Temperature Sensor 246
Clock 244
Network Infc. 204f
Network Infc. 204g
Network Infc. 204h
Network Infc. 204i
Network Infc. 208v
Network Infc. 204a
Network Infc. 204b
Network Infc. 204c
Network Infc. 204d
Network Infc. 204e
Switch Core 208
Forwarding Engine 212
FDB 216
Memory 224
Counters 220
IPE 228
CPU Packet Buffer 260
CPU 252
Memory 256
Interconnect 260
DMA Engine 276
Telemetry Data Xmit Controller 288
DMA 272
Packet Generator 284
Memory 280
Collects telemetry data, and transfers telemetry packets to switch core 208 for transmission
Encapsulates telemetry data in telemetry packets Hardware circuitry of network device collects telemetry data generated by the network device 404

The hardware circuitry generates packets that include respective subsets of the telemetry data received at block 404
408

The hardware circuitry prompts the network device to transmit the packets to a remote network device 412

STREAMING TELEMETRY DATA FROM NETWORK DEVICE TO REMOTE COLLECTOR

CROSS-REFERENCES TO RELATED APPLICATIONS

This application claims the benefit of U.S. Provisional Patent App. No. 63/538,796, entitled "Telemetry Streaming to Remote Collector Over an Ethernet Network in HW," filed on Sep. 15, 2023, the disclosure of which is expressly incorporated herein by reference in its entirety.

FIELD OF TECHNOLOGY

The present disclosure relates generally to communication networks, and more particularly to communicating operational status information in a communication network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A typical network device, such as a network switch, a router, etc., includes multiple ports coupled to respective network links, and a specialized hardware processor (sometimes referred to as a "packet processor") that processes packets received by the network device to determine to which ports the packets are to be forwarded for transmission from the network device. The packet processor includes a forwarding database that stores associations between network addresses (e.g., medium access control (MAC) addresses) and ports of the network device. When the network device receives a packet, the packet processor searches the forwarding database for a match with header information (including, for example, a destination MAC address). When a matching entry in the forwarding database is detected, the packet processor forwards the packet to a port indicated by the matching entry.

The network device also includes a central processing unit (CPU) that executes machine readable instructions stored in a memory. The CPU handles functions of the network device that typically do not require the high speed processing capability of the packet processor, such as management-related functions. When the network device receives a packet intended for the network device itself, the packet processor will transfer the packet to the CPU for further processing. Similarly, the CPU will generate packets on behalf of the network device itself and transfer the packets to the packet processor for transmission.

To manage a communication network having multiple network devices (e.g., network switches, routers, etc.), it is useful to gather and process operational status information (e.g., loading information, port status information, link status information, etc.) from the multiple network devices. For example, a computer (sometimes referred to as a "remote collector") communicatively coupled to the communication network receives operational status information (sometimes referred to as "telemetry data") from the multiple network devices. The telemetry data can be used to monitor performance of the communication network and/or to determine actions to be taken with regard to the communication network, such as reconfiguring the communication network in response to heavy loading on some network links, ports/network links going down, etc.

SUMMARY

In an embodiment, a network device comprises: a switch core packet processor having a forwarding engine configured to process packets received by the network device to determine ports of the network device via which the packets are to be forwarded, the switch core packet processor further including circuitry configured to generate telemetry data that provides information regarding operational status of at least one of i) the network device, and ii) one or more network links connected to ports of the network device; and hardware circuitry. The hardware circuitry is configured to: collect telemetry data generated by the switch core packet processor; generate packets that include respective sets of the telemetry data collected by the hardware circuitry, the packets generated by the hardware circuitry being addressed to a remote network device in, or communicatively coupled to, a communication network that includes the network device; and provide the packets to the switch core packet processor to prompt the switch core packet processor to transmit the packets to the remote network device via one or more ports of the network device.

In another embodiment, a method for communicating telemetry data generated by a network device in a communication network includes: collecting, by hardware circuitry of the network device, the telemetry data generated by the network device, the telemetry data providing information regarding operational status of at least one of i) the network device, and ii) one or more network links connected to the network device; generating, by the hardware circuitry, packets that include respective sets of the telemetry data collected by the hardware circuitry, the packets generated by the hardware circuitry to be addressed to a remote network device in, or communicatively coupled to, the communication network; and prompting, by the hardware circuitry, the network device to transmit the packets to the remote network device.

BRIEF DESCRIPTION OF THE DRAWINGS

FIG. 1 is a simplified block diagram of an example communication network having network devices that generate telemetry data and transmit the telemetry data to a remove network device, according to an embodiment.

FIG. 2 is a simplified block diagram of an example network device of the communication network of FIG. 1, according to an embodiment.

DETAILED DESCRIPTION

Figure 3:
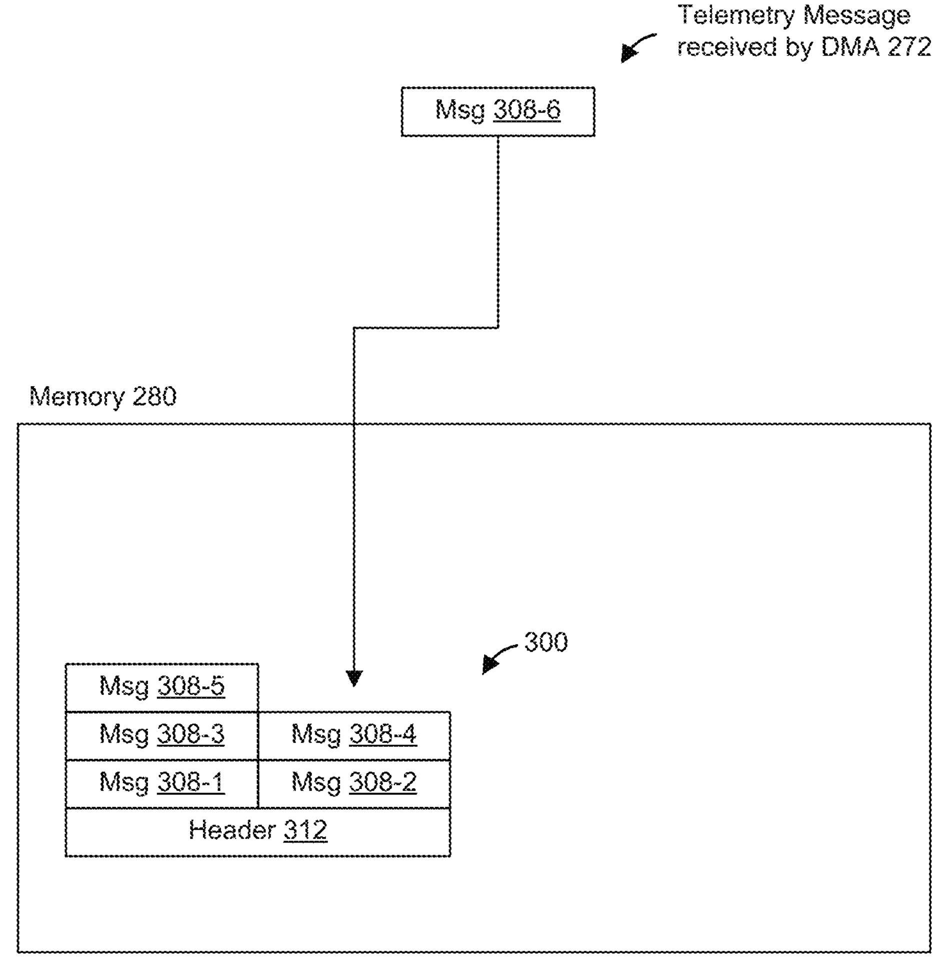
FIG. 3 is a simplified diagram illustrating a method for generating a telemetry packet by adding telemetry data messages to the telemetry packet as the telemetry messages are received, according to an embodiment.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

As discussed above, it is useful to collect telemetry data (e.g., loading information, port status information, link status information, etc.) from multiple network devices in a communication network. Often, network devices are configured to collect telemetry data and transmit the telemetry data to a remote computer (i.e., a remote collector) for processing. As a central processing unit (CPU) of a typical network device generates, and initiates transmission of, packets on behalf of the network device, the CPU will collect telemetry data generated by the network device, generate packets that include the telemetry data, and control the network device to transmit the packets.

CPUs of network devices, however, are also tasked with other important functions of the network device, such as managing operational parameters of the network device, performing security-related operations, performing in depth processing of certain packets flagged by the packet processor (e.g., for detecting new packet flows, for deep packet inspection, etc.). Thus, the collecting and transmission of telemetry data adds to the processing load of the CPU, which may already be high due to other important functions being performed by the CPU.

In some embodiments described below, hardware circuitry of a network device, separate from a CPU of the network device, is configured to: collect telemetry data generated by the network device; generate packets that include respective sets of the telemetry data; and prompt the network device to transmit the packets to a remote network device. In some embodiments, the hardware circuitry performs one or more of the operations described above without intervention of the CPU, thus freeing up processing load of the CPU to perform other functions of the network device. In some embodiments, the CPU configures the hardware circuitry, and once the hardware circuitry is configured the hardware circuitry performs one or more of the operations described above without intervention of the CPU.

FIG. 1 is a simplified block diagram of an example communication network 100, according to an embodiment. The communication network 100 is used in various suitable environments, such as a data center, a graphics processing unit (GPU) data center, a server farm, an enterprise communication network, a wide area network (WAN), etc. The communication network 100 includes a plurality of network devices 108, such as network switches, routers, etc. The network devices 108 are interconnected by network links (not shown), and network devices 108 each include a plurality of ports (not shown) connected to respective network links.

Network devices 108 each include a specialized hardware processor (sometimes referred to as a "packet processor") 112 that processes packets received by the network device 108 to determine to which ports the packets are to be forwarded for transmission from the network device 108.

Network devices 108 each also include a CPU 116 that executes machine readable instructions stored in a memory (not shown) of the network device 108. The CPU 116 handles functions of the network device 108 that typically do not require the high speed processing capability of the packet processor 112, such as management-related functions, and/or functions that are more economically implemented in software, for example. When the network device 108 receives a packet intended for the network device 108 itself (e.g., an Open Shortest Path First (OSPF) routing protocol packet, an Enhanced Interior Gateway Routing Protocol (EIGRP) packet, an Intermediate System to Intermediate System (IS-IS) packet, a Routing Information Protocol (RIP) packet, etc.), the packet processor 112 will (at least for some such packets) transfer the packet to the CPU 116 for further processing. Similarly, the CPU 116 will generate packets on behalf of the network device 108 itself, and transfer the packets to the packet processor 112 for transmission.

Network devices 108 each also include hardware circuitry 120 (sometimes referred to as "telemetry data packetization/streaming hardware"), separate from the CPU 116, that is configured to: collect telemetry data generated by the network device 108; generate packets (sometimes referred to herein as "telemetry packets") that include respective sets of the telemetry data; and prompt the network device 108 to transmit the telemetry packets to a remote computer 132. In some embodiments, the telemetry data packetization/streaming hardware 120 performs one or more of the operations described above without intervention of software (e.g., executed by the CPU 116), thus freeing up processing load of the CPU 116 to perform other functions of the network device 108. In some embodiments, the CPU 116 configures the telemetry data packetization/streaming hardware 120, and once the telemetry data packetization/streaming hardware 120 is configured, the telemetry data packetization/streaming hardware 120 performs one or more of the operations described above without intervention of the CPU 116.

In some embodiments in which the telemetry data packetization/streaming hardware 120 is communicatively coupled to one or more other components of the network device 108 via one or more buses, the telemetry data packetization/streaming hardware 120 includes bus interface circuitry configured to retrieve telemetry data from the one or more other components via the one or more other buses. In some embodiments in which the telemetry data packetization/streaming hardware 120 retrieves telemetry data from one or more other memory devices of the network device 108, the telemetry data packetization/streaming hardware 120 includes memory interface circuitry configured to retrieve telemetry data from the one or more memory devices.

The network devices 108 transmit telemetry packets to the remote computer 132 (sometimes referred to as a "remote collector"), which is included in or communicatively coupled to the communication network 100. For example, the remote collector 132 uses the telemetry data from the network devices 108 to monitor performance of the communication network 100 and/or to determine actions to be taken with regard to the communication network 100, such as reconfiguring the communication network 100 in response to heavy loading on some network links and/or network devices 108, ports of the network devices 108 and/or network links between network devices 108 going down, etc.

Although a particular number (six) of network devices 108 are illustrated in FIG. 1, the communication network 100 includes any suitable number of network devices 108, such as one to five, or greater than six, in various embodiments. In some embodiments, the communication network 100 includes one or more other network devices (e.g., network switches, routers, etc.) with a suitable structure, different than the structure of the network devices 108, that omits the telemetry data packetization/streaming hardware 120. In some such embodiments, CPUs of the other network devices generate telemetry packets and transmit the telemetry packets to the remove collector 132. In some embodiments that include such other network devices, the network devices 108 and the other network devices are interconnected via network links.

In some embodiments, all of the network devices 108 include the telemetry data packetization/streaming hardware 120 (or similar telemetry data packetization/streaming hardware). In other embodiments, one or more of the network devices 108 include the telemetry data packetization/streaming hardware 120 (or similar telemetry data packetization/streaming hardware), whereas in one or more other network devices 108 telemetry collection and packetization is performed by software executed by multipurpose hardware circuitry (e.g., a processor).

FIG. 2 is a simplified block diagram of an example network device 200 that includes telemetry data packetization/streaming hardware like the telemetry data packetization/streaming hardware 120 of FIG. 1, according to an embodiment. In an embodiment, the network device 200 is included in the communication network 100 of FIG. 1, according to an embodiment. For example, the network device 200 is an embodiment of the network device 108 of FIG. 1. In other embodiments, the network device 200 is included in another suitable communication network different than the communication network 100 of FIG. 1. In other embodiments, one or more of (or all of) the network devices 108 of the communication network 100 have a suitable structure different than the network device 200.

The network device 200 includes a plurality of network interfaces 204 that are communicatively coupled to network links of a communication network. In an embodiment, the network interfaces 204 correspond to ports (e.g., optical ports configured to connect with fiber optic cables, ports configured to connect with electrical communication cables, etc.). In another embodiment, the network interfaces 204 are communicatively coupled to ports via internal communication links (not shown; e.g., high speed serial links or other suitable communication links) of the network device 200.

The network device 200 also includes a switch core 208 coupled to the network interfaces 204. The switch core 208 is a specialized hardware processor (sometimes referred to as a "packet processor" or "switch core packet processor") that processes packets received by the network device 200 to determine to which network interfaces 204 the packets are to be forwarded for transmission from the network device 200. The switch core 208 is configured to perform other suitable functions such as described below.

The switch core 208 includes a forwarding engine 212, which is coupled to a forwarding database (FDB) 216. The FDB 216 stores associations between network addresses (e.g., medium access control (MAC) addresses or other suitable network addresses) and network interfaces 204 of the network device 200. When the network device 200 receives a packet, the forwarding engine 212 searches the FDB 216 for a match with header information (including, for example, a destination MAC address or another suitable network address) in the packet. When an entry in the FDB 216 matching the header information is detected, the forwarding engine 212 retrieves from the entry an indication of the network interface 204 to which the packet is to be forwarded, and causes the switch core 208 to forward the packet is to the network interface 204 corresponding to the retrieve indication.

The switch core 208 is configured to generate telemetry data such as described above. For example, the switch core 208 is configured to use counters 220 to: count respective amounts of data (e.g., number of packets, numbers of bytes, numbers of bits, etc.) in packet flows, count respective amounts of data forwarded to network interfaces 204, and/or count respective amounts of data forwarded to ports, etc. In some embodiments, the switch core 208 is configured to use the counters 220 to count amounts of data, such as described above, over fixed time durations (e.g., an amount of data per second). In some embodiments, the switch core 208 is configured to use the counters 220 to count amounts of data, such as described above, over a variable time duration (e.g., an amount of data in a packet flow during a lifetime of the packet flow, an amount of data since a triggering event, etc.).

Each of at least some of the counters 220 includes a memory (e.g., a register or another suitable memory device) that stores a value of the counter 220, in an embodiment. For each of at least some of the counters 220, the memory of the counter 220 stores a message (sometimes referred to herein as a "telemetry message") having a message header and a message body, the message body including the value of the counter 220. The message header includes context information regarding the counter value in the message body. For example, if the counter 220 records an amount of data corresponding to a packet flow, the message header includes an identifier (ID) of the packet flow, in an embodiment. As another example, if the counter 220 records an amount of data forwarded to a port for transmission, the message header includes an ID of the port and an indicator that that message body corresponds to an amount of data transmitted, in an embodiment. As another example, if the counter 220 records an amount of data belonging to a priority set forwarded to a port for transmission, the message header includes an ID of the port, an indicator that the message body corresponds to the priority set, and an indicator that the message body corresponds to an amount of data transmitted, in an embodiment. As another example, if the counter 220 records an amount of data received from a port, the message header includes an ID of the port and an indicator that that message body corresponds to an amount of data received, in an embodiment.

In some embodiments, the switch core 208 includes circuitry configured to retrieve values of the counter 220 and to generate telemetry messages based on the retrieved counter values. In some embodiments in which the switch core 208 includes circuitry configured to generate telemetry messages, the circuitry is also configured to store the telemetry messages in a memory 224 of the switch core 208.

In some embodiments, the switch core 208 includes circuitry configured to generate telemetry messages corresponding to the FDB 216. For example, the circuitry generates the telemetry message to include a message body that includes information regarding the FDB 216 (e.g., one or more of i) contents of the FDB 216, ii) an indication of a number of entries in the FDB 216, iii) an indication of an available capacity of the FDB 216, etc.), in an embodiment. The circuitry generates the telemetry message to also include a message header that indicates at least one of i) the message body includes information regarding an FDB, and ii) a format of the message body.

In some embodiments in which the switch core 208 includes circuitry configured to generate telemetry messages corresponding to the FDB 216, the circuitry is also configured to store the telemetry messages in the memory 224.

In some embodiments, the switch core 208 includes ingress processing engine (IPE) circuitry 228 that is configured to perform ingress processing on packets received via the network interfaces 204. In an embodiment, the IPE circuitry 228 performs one or more processing operations such as: i) parsing header data in received packets, ii) stripping of tunnel headers from received packets, iii) dropping received packets with certain attributes and/or when the network device 200 is in a certain state, iv) duplicating certain received packets, v) making initial categorizations of received packets, etc.

In some embodiments, the switch core 208 includes circuitry configured to generate telemetry messages corresponding to the IPE circuitry 228. For example, the circuitry generates the telemetry message to include a message body that includes information regarding the IPE circuitry 228, in an embodiment. The circuitry generates the telemetry message to also include a message header that indicates at least one of i) the message body includes information regarding the IPE circuitry 228, and ii) a format of the message body.

In some embodiments in which the switch core 208 includes circuitry configured to generate telemetry messages corresponding to the IPE circuitry 228, the circuitry is also configured to store the telemetry messages in the memory 224.

In some embodiments, each of at least some of the network interfaces 204 includes one or more counters 240 that the network interface 204 uses to: count an amount of data (e.g., number of packets, numbers of bytes, numbers of bits, etc.) transmitted by the network interface 204, and/or count an amount of data received by the network interface 204, etc. In some embodiments, the network interface 204 is configured to use the counters 240 to count amounts of data, such as described above, over fixed time durations (e.g., an amount of data per second). In some embodiments, the network interface 204 is configured to use the counters 240 to count amounts of data, such as described above, over a variable time duration (e.g., an amount of data since a triggering event, etc.).

Each of at least some of the counters 240 includes a memory (e.g., a register or another suitable memory device) that stores a value of the counter 240, in an embodiment. For each of at least some of the counters 240, the memory of the counter 240 stores a telemetry message having a message header and a message body, the message body including the value of the counter 240. The message header includes context information regarding the counter value in the message body. For example, if the counter 240 records an amount of data transmitted by the network interface 204, the message header includes an ID of the network interface 240 and an indicator that that message body corresponds to an amount of data transmitted, in an embodiment. As another example, if the counter 240 records an amount of data received by the network interface 204, the message header includes an ID of the network interface 204 and an indicator that that message body corresponds to an amount of data received, in an embodiment.

In some embodiments, the switch core 208 includes circuitry configured to retrieve values of the counters 240 and to generate respective telemetry messages based on the retrieved counter values. In some embodiments in which the switch core 208 includes circuitry configured to generate such telemetry messages, the circuitry is also configured to store the telemetry messages in the memory 224.

In some embodiments, the counters 240 are omitted.

The network device 200 also includes clock circuit 244 that is configured to maintain a clock, such as a time-of-day clock or another suitable clock.

In some embodiments, the network device 200 includes a temperature sensor 246 that is configured to measure a temperature in the network device 200. In some embodiments, the switch core 208 includes circuitry configured to retrieve temperature measurement values from the temperature sensor 246 and to generate respective telemetry messages based on the retrieved temperature measurement values. In some embodiments in which the switch core 208 includes circuitry configured to generate such telemetry messages, the circuitry is also configured to store the telemetry messages in the memory 224.

In some embodiments, the temperature sensor 246 is omitted.

In some embodiments, the network device 200 includes a power usage sensor 248 that is configured to measure power usage of the network device 200. In some embodiments, the switch core 208 includes circuitry configured to retrieve power usage measurement values from the power usage sensor 248 and to generate respective telemetry messages based on the retrieved power usage measurement values. In some embodiments in which the switch core 208 includes circuitry configured to generate such telemetry messages, the circuitry is also configured to store the telemetry messages in the memory 224.

In some embodiments, the power usage sensor 2486 is omitted.

The network device 200 also includes a CPU 252 that executes machine readable instructions stored in a memory 256. The CPU 252 handles functions of the network device 200 that typically do not require the high speed processing capability of the switch core 208, such as management-related functions, and/or functions that are more economically implemented in software, for example. When the network device 200 receives a packet intended for the network device 200 itself (e.g., an OSPF routing protocol packet, an EIGRP packet, an IS-IS packet, an RIP packet, etc.), the switch core 208 will (at least for some such packets) transfer the packet to the CPU 252 for further processing. For example, the switch core 208 includes a buffer 260 (sometimes referred to herein as a "CPU packet buffer") for storing packets to be transferred to the CPU 252, and the switch core 208 stores packets to be processed by the CPU 252, such as described above, in the buffer 260. Similarly, the CPU 252 will generate packets on behalf of the network device 200 itself, and transfer the packets to the switch core 208 for transmission. In an embodiment, packets generated by the CPU 252 are transferred to CPU packet buffer 260, the switch core 208 retrieves the packets generated by the CPU 252 from the CPU packet buffer 260, and forwards the packets to appropriate ones of the network interface 204, in some embodiments.

The CPU 252 and the memory 256 are communicatively coupled via an interconnect 260, in an embodiment.

The network device 200 further includes direct memory access (DMA) circuitry 272 communicatively coupled to the memory 256 (and optionally the CPU 252) via the interconnect 260. The DMA circuitry 272 is also communicatively coupled to the switch core 208. In some embodiments, the DMA circuitry 272 is also communicatively coupled to at least some of the network interfaces 204. The DMA circuitry 272 is configured to transfer data from the switch core 208 to the memory 256, and vice versa. In some embodiments, the DMA circuitry 272 is also configured to transfer data from at least some of the network interfaces 204 to the memory 256.

The DMA circuitry 272 includes a DMA engine 276 that is configured to control operation of the DMA circuitry 272. The DMA engine 276 includes hardware circuitry configured to perform operations such as described herein. The DMA engine 276 includes one or more hardware state machines configured to generate control signals that control operation of the DMA circuitry 272, in an embodiment. The DMA engine 276 includes memory (e.g., registers or other suitable memory devices) that store information related to operation of the DMA circuitry 272, such as indications of one or more of: i) memory locations in the memory 256 to which information is to be stored, ii) memory locations in the memory 256 from which information is to be retrieved, iii) memory devices (and/or memory locations therein) within the switch core 208 from which information is to be retrieved, iv) memory devices (and/or memory locations therein) of the network interfaces 204 from which information is to be retrieved, etc., in various embodiments.

The DMA engine 276 is configured to control the DMA circuitry 272 to i) transfer packets from the CPU packet buffer 260 to the memory 256, and ii) transfer packets from the memory 256 to the CPU packet buffer 260, in an embodiment. In operation, the CPU 252 generates a packet and stores the packet in the memory 256, and then prompts the DMA engine 276 to control the DMA circuitry 272 to transfer the packet to the CPU packet buffer 260, in an embodiment. The switch core 208 then retrieves the packet from the CPU packet buffer 260 and forwards the packet to one or more network interface 204 for transmission from the network device 200, in an embodiment.

As another example, when the switch core 208 receives a packet addressed to the network device 200 itself, the switch core 208 stores the packet in the CPU packet buffer 260, in an embodiment. The switch core 208 (or the CPU 252) prompts the DMA engine 276 to control the DMA circuitry 272 to transfer the packet from the CPU packet buffer 260 to the memory 256, in an embodiment. The CPU 252 then retrieves the packet from the memory 256 and processes the packet, in an embodiment.

The DMA circuitry 272 generally performs operations of the telemetry data packetization/streaming hardware 120 described above with reference to FIG. 1, in some embodiments. For example, as is discussed further below, the DMA circuitry 272 is configured to: collect telemetry data generated by the network device 200; generate telemetry packets that include respective sets of the telemetry data; and prompt the network device 200 to transmit the telemetry packets to a remote computer (e.g., the remote computer 132). In some embodiments, DMA circuitry 272 performs one or more of the operations described above without intervention of software (e.g., executed by the CPU 252), thus freeing up processing load of the CPU 252 to perform other functions of the network device 200. In some embodiments, the CPU 252 configures the DMA circuitry 272 with regard to telemetry data collection, packetization, and/or transmission, and once the DMA circuitry 272 is configured, the DMA circuitry 272 performs one or more of the operations described above without intervention of the CPU 252.

The DMA circuitry 272 includes a memory 280 configured to store telemetry data received by the DMA circuitry 272. For example, the DMA engine 276 is configured to retrieve telemetry data from the switch core 208 (e.g., from one or more of the counters 220, the memory 224, the IPE circuitry 228, etc.) and/or from the network interfaces 204 (e.g., from the counters 240), and store the telemetry data in the memory 280, in various embodiments. As another example, the switch core 208 is configured to send telemetry data (e.g., from one or more of the counters 220, the memory 224, the IPE circuitry 228, etc.) to the DMA circuitry 272, and the DMA engine 276 is configured to store the telemetry data in the memory 280, in various embodiments.

In some embodiments, the DMA engine 276 is configured to retrieve telemetry data in response to an event. Examples of events that prompt the DMA engine 276 to retrieve telemetry data include a prompt from the CPU 252, a prompt from the switch core 208, a timer expiring, etc. In various embodiment, the switch core 208 prompts the DMA circuitry 272 to retrieve telemetry data in response to the switch core 208 determining one or more of the following: i) that congestion is occurring in one or more of the network interfaces 204, ii) that a port of the network device 200 has failed, iii) that a network link connected to a port of the network device 200 has gone down, iv) that a temperature measured by the temperature sensor 246 has exceeded a threshold, v) that a power usage level measured by the power sensor 248 has exceeded a threshold, etc.

In some embodiments, the DMA engine 276 includes a first timer (not shown) and is configured to retrieve telemetry data in response to the first timer expiring. In an embodiment, the DMA engine 276 is also configured to reset the first timer when the first timer expires. In embodiments in which the DMA engine 276 retrieves telemetry data and resets the first timer in response to the first timer expiring, the DMA engine 276 periodically retrieves telemetry data.

In another embodiment, the DMA engine 276 periodically retrieves telemetry data based on the DMA engine 276 monitoring the clock 244 and uses the clock 244 to determine when the DMA engine 276 is to retrieve telemetry data.

The DMA circuitry 272 also includes a packet generator 284 that is configured to generate packets having subsets of telemetry data stored in the memory 280. In an embodiment, the packet generator 284 is configured to generate telemetry packets having predetermined headers selected from a set of one or more predetermined (and optionally configurable) headers. In an embodiment, the one or more predetermined headers are stored in the memory 280. In an embodiment, the one or more predetermined headers include Ethernet headers. In other embodiments, the one or more predetermined headers additionally or alternatively include one or more other suitable headers different than Ethernet headers.

In an embodiment, the packet generator 284 is configured to generate telemetry packets having a maximum packet size. In some embodiments, the maximum packet size is configurable (e.g., by the CPU 252).

In an embodiment, the packet generator 284 generates a telemetry packet (stored in the memory 280) by adding telemetry data to the telemetry packet (stored in the memory 280) as telemetry data is received by the by the DMA circuitry 272. FIG. 3 is a simplified diagram illustrating the packet generator 284 generating a telemetry packet 300 (which is stored in the memory 280) by adding telemetry data messages 308 to the telemetry packet 300 as the telemetry messages 308 are received by the by the DMA circuitry 272, according to an embodiment. In the example of FIG. 3, the indices of the telemetry messages 308 indicate an order in which the telemetry messages 308 have been received by the DMA circuitry 272. For example, the telemetry message 308-1 is the earliest the telemetry message 308 to be received by the DMA circuitry 272, and the telemetry message 308-6 is the most recently received telemetry message 308. As each telemetry message 308 is received by the DMA circuitry 272, the packet generator 284 adds the telemetry message 308 to the telemetry packet 300. The telemetry packet 300 includes a header 312 such as described above.

In response to receiving the telemetry message 308-1, the packet generator 284 adds the telemetry message 308-1 to the telemetry packet 300. In response to receiving the telemetry message 308-2, the packet generator 284 adds the telemetry message 308-2 to the telemetry packet 300, which already includes the telemetry message 308-1. In response to receiving the telemetry message 308-3, the packet generator 284 adds the telemetry message 308-3 to the telemetry packet 300, which already includes the telemetry messages 308-1 and 308-2; and so on.

Although FIG. 3 illustrates the telemetry messages 308 as having a same size, two or more of the telemetry messages 308 have different sizes, in some embodiments.

The packet generator 284 determines whether a size of the telemetry packet 300 has reached the maximum packet size in connection with adding telemetry data to the telemetry packet 300; and in response to determining that the size of the telemetry packet 300 has reached the maximum packet size, determines that no further telemetry data should be added to the telemetry packet 300 and that the telemetry packet 300 is ready to be transmitted by the network device 200, according to an embodiment. For example, in response to determining that adding an additional telemetry message 308 to the telemetry packet 300 would cause a size of the telemetry packet 300 to exceed the maximum packet size, the packet generator 284 does not add the additional telemetry message 308 to the telemetry packet 300 and determines that the telemetry packet 300 is ready to be transmitted, in an embodiment. Additionally, the packet generator 284 generates another telemetry packet and adds the additional telemetry message 308 (that would not fit in the previously generated telemetry packet that is ready to be transmitted) to the other telemetry packet.

In some embodiments, telemetry data received by the DMA circuitry 272 is first stored in a buffer memory (not shown) and then transferred to the memory 280. In some embodiments, the packet 300 is stored in memory 280 as a linked list, with packet messages 308 corresponding to elements of the linked list. In other embodiments, the packet 300 is stored in the memory 280 in another suitable manner.

In some embodiments, the packet generator 284 generates telemetry packets without intervention by software (e.g., without intervention by software executed by the CPU 252). In some embodiments, the CPU 252 configures the packet generator 284, and after configuration by the CPU 252 the packet generator 284 generates telemetry packets without intervention by the CPU 252.

The packet generator 284 includes hardware circuitry configured to perform operations such as described herein. For example, the packet generator 284 includes one or more hardware state machines configured to generate control signals that control operation of the packet generator 284, in an embodiment. The packet generator 284 includes memory (e.g., registers or other suitable memory devices) that store information related to operation of the packet generator 284, such as indications of one or more of: i) memory location in the memory 280 at which a current telemetry packet is being generated, ii) a current size of the current telemetry packet, iii) a maximum size of telemetry packets, etc., in various embodiments. In some embodiments, the packet generator 284 includes an accumulator that records a current size of the current telemetry packet.

Although FIG. 3 was described with reference to FIG. 2, the method of generating telemetry packets 308 described with reference to FIG. 3 is implemented by other suitable network devices different than the network device 200 of FIG. 2, in some embodiments. Similarly, the packet generator 284 of FIG. 2 generates telemetry packets in another suitable manner different than the method of generating telemetry packets 308 described with reference to FIG. 3, in some embodiments.

Referring again to FIG. 2, the DMA circuitry 272 includes a telemetry data transmit controller 288 that is configured to prompt the switch core 208 to transmit telemetry packets generated by the DMA circuitry 272. In an embodiment, the telemetry data transmit controller 288 is configured to control the DMA circuitry 272 to transfer a telemetry packet from the memory 280 to the switch core 208, which prompts the switch core 208 to transmit the telemetry packet. In an embodiment, the telemetry data transmit controller 288 is configured to control the DMA engine 276 to transfer the telemetry packet from the memory 280 to the switch core 208. In some embodiments, the DMA circuitry 272 transfers the telemetry packet from the memory 280 to CPU packet buffer 260, which prompts the switch core 208 to transmit the telemetry packet.

In some embodiments, the telemetry data transmit controller 288 is configured to prompt the switch core 208 to transmit a telemetry packet in response to determining that the telemetry packet is ready to be transmitted. For example, in an embodiment in which the packet generator 284 determines when a telemetry packet is ready to be transmitted (e.g., based on a size of the telemetry packet), the telemetry data transmit controller 288 is prompts the switch core 208 to transmit the telemetry packet in response to the packet generator 284 determining that the telemetry packet is ready to be transmitted.

In some embodiments, the telemetry data transmit controller 288 is additionally or alternatively configured to prompt the switch core 208 to transmit a telemetry packet based on a time when a previous telemetry packet was previously transmitted. For example, the telemetry data transmit controller 288 determines whether a time duration has reached a threshold, the time duration corresponding to a time difference between i) a previous time corresponding to a previous telemetry packet being transmitted by the network device 200 (e.g., a time when the telemetry data transmit controller 288 prompted the DMA circuitry 272 to transfer the previous telemetry packet to the switch core 208, a time when the network device 200 transmitted the previous telemetry packet, etc.), and ii) a current time. In response to determining that the time duration has reached the threshold, the telemetry data transmit controller 288 prompts the switch core 208 to transmit the telemetry packet. In an embodiment, the telemetry data transmit controller 288 prompts the switch core 208 to transmit the telemetry packet when the time duration has reached the threshold even when a size of the telemetry packet has not reached a maximum size.

In an embodiment, the threshold is configurable (e.g., by the CPU 252).

In some embodiments, the telemetry data transmit controller 288 includes a second timer (not shown) and is configured to prompt the switch core 208 to transmit a telemetry packet in response to the second timer expiring. In an embodiment, the telemetry data transmit controller 288 is also configured to reset the second timer in connection with prompting the switch core 208 to transmit a telemetry packet. In some embodiments in which the telemetry data transmit controller 288 i) resets the second timer in connection with prompting the switch core 208 to transmit a telemetry packet, ii) prompts the switch core 208 to transmit a telemetry packet in response to the second timer expiring, and iii) prompts the switch core 208 to transmit a telemetry packet in response to determining that the telemetry packet is ready to be transmitted, the telemetry data transmit controller 288 prompts the switch core 208 to transmit a telemetry packet when the earlier of the following occurs: i) the telemetry packet is ready to be transmitted, and ii) the second timer expires.

In some embodiments in which the telemetry data transmit controller 288 i) resets the second timer in connection with prompting the switch core 208 to transmit a telemetry packet, ii) and prompts the switch core 208 to transmit a telemetry packet in response to the second timer expiring, the telemetry data transmit controller 288 prompts the switch core 208 to transmit telemetry packets periodically.

In some other embodiments, the telemetry data transmit controller 288 determines whether the time duration (e.g., corresponding to a time difference between i) a previous time corresponding to a previous telemetry packet being transmitted by the network device 200, and ii) a current time) has reached a threshold based on monitoring the clock 244.

In some embodiments, the telemetry data transmit controller 288 prompts the network device 200 to transmit telemetry packets (e.g., by prompting the switch core 208) without intervention by software (e.g., without intervention by software executed by the CPU 252). In some embodiments, the CPU 252 configures the telemetry data transmit controller 288, and after configuration by the CPU 252 telemetry data transmit controller 288 prompts the network device 200 to transmit telemetry packets without intervention by the CPU 252.

The telemetry data transmit controller 288 includes hardware circuitry configured to perform operations such as described herein. For example, the telemetry data transmit controller 288 includes one or more hardware state machines configured to generate control signals that control operation of the telemetry data transmit controller 288, in an embodiment. The telemetry data transmit controller 288 includes memory (e.g., registers or other suitable memory devices) that store information related to operation of the telemetry data transmit controller 288, such as indications of one or more of: i) memory location in the memory 280 at which a telemetry packet that is to be transmitted is located, ii) the threshold time duration associated with a time since a previous telemetry packet was transmitted, etc., in various embodiments.

Figure 4:
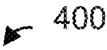
FIG. 4 is a simplified flow diagram of an example method for communicating telemetry data generated by a network device, according to an embodiment.

FIG. 4 is a simplified flow diagram of an example method 400 for communicating telemetry data generated by a network device, according to an embodiment. One or both of the network device 108-1 of FIG. 1 and the network device 200 of FIG. 2 implements the method 400, according to some embodiments, and the method 400 is described with reference to FIGS. 1 and 2 for ease of explanation. In other embodiments, the network device 108-1 and/or the network device 200 implements another suitable method for communicating telemetry data different than the method 400. Additionally, the method 400 is implemented by another suitable network device different than the network device 108-1 and the network device 200 of FIGS. 1-2, in some embodiments.

At block 404, hardware circuitry of the network device collects telemetry data generated by the network device. The telemetry data provides information regarding operational status of at least one of i) the network device, and ii) one or more network links connected to the network device. In an embodiment, the telemetry data packetization/streaming hardware 120 collects telemetry data generated by the network device 108. In another embodiment, the DMA circuitry 120 collects telemetry data generated by the network device 200.

Collecting telemetry data at block 404 includes collecting telemetry data in response to prompts by a CPU of the network device (e.g., the CPU 116, the CPU 252, etc.), the CPU configured to execute machine readable instructions stored in a memory of the network device. In other embodiments, collecting telemetry data at block 404 includes collecting telemetry data without intervention by the CPU of the network device.

At block 408, the hardware circuitry generates packets (e.g., telemetry packets) that include respective sets of the telemetry data collected by the hardware circuitry. The packets are generated at block 408 to be addressed to a remote network device in, or communicatively coupled to, the communication network. For example, the telemetry data packetization/streaming hardware 120 generates the packets, in an embodiment. As another example, the DMA circuitry 120 generates the packets, in an embodiment.

In an embodiment, generating the packets at block 408 includes, for each of at least some of the packets: adding telemetry data to the packet, by the hardware circuitry, as telemetry data is collected by the by the hardware circuitry.

In an embodiment, generating the packets at block 408 is performed without intervention by software executed by the network device. For example, generating the packets at block 408 is performed without intervention by the CPU, in an embodiment.

At block 412, the hardware circuitry prompts the network device to transmit the packets to the remote network device. For example, the telemetry data packetization/streaming hardware 120 prompts the network device 108 to transmit the packets, in an embodiment. As another example, the DMA circuitry 120 prompts the network device 200 to transmit the packets, in an embodiment.

In an embodiment, prompting the network device to transmit the packets includes, for each of at least some of the packets: determining, by the hardware circuitry, whether a size of the packet has reached a maximum in connection with adding telemetry data to the packet; and in response to determining that the size of the packet has reached the maximum, prompting the network device to transmit the packet.

In another embodiment, prompting the network device to transmit the packets includes, for each of at least some of the packets: determining, by the hardware circuitry, whether a time duration has reached a threshold, the time duration corresponding to a different between i) a time corresponding to transmission of a previous packet having telemetry data, and ii) a current time; and in response to determining that the time duration has reached the threshold, prompting the network device to transmit the packet even when a size of the packet has not reached the maximum.

In another embodiment, prompting the network device to transmit the packets includes, for each of at least some of the packets: determining, by the hardware circuitry, whether a time duration has reached a threshold, the time duration corresponding to a different between i) a time corresponding to transmission of a previous packet having telemetry data, and ii) a current time; and in response to determining that the time duration has reached the threshold, prompting the network device to transmit the packet.

In an embodiment, prompting the network device to transmit the packets at block 412 is performed without intervention by software executed by the network device. For example, prompting the network device to transmit the packets at block 412 is performed without intervention by the CPU, according to an embodiment.

Embodiment 1: A network device, comprising: a switch core packet processor having a forwarding engine configured to process packets received by the network device to determine ports of the network device via which the packets are to be forwarded, the switch core packet processor further including circuitry configured to generate telemetry data that provides information regarding operational status of at least one of i) the network device, and ii) one or more network links connected to ports of the network device; and hardware circuitry. The hardware circuitry is configured to: collect telemetry data generated by the switch core packet processor; generate packets that include respective sets of the telemetry data collected by the hardware circuitry, the packets generated by the hardware circuitry being addressed to a remote network device in, or communicatively coupled to, a communication network that includes the network device; and provide the packets to the switch core packet processor to prompt the switch core packet processor to transmit the packets to the remote network device via one or more ports of the network device.

Embodiment 2: The network device of embodiment 1, wherein the hardware circuitry comprises a timer, and the hardware circuitry is further configured to: determine times at which to collect the telemetry data using the timer.

Embodiment 3: The network device of one of embodiments 1 and 2, wherein the hardware circuitry is configured to, for each of at least some of the packets, as part of generating the packet: add telemetry data to the packet as telemetry data is collected by the by the hardware circuitry.

Embodiment 4: The network device of embodiment 3, wherein the hardware circuitry is configured to, for each of at least some of the packets: determine whether a size of the packet has reached a maximum in connection with adding telemetry data to the packet; and in response to determining that the size of the packet has reached the maximum, provide the packet to the switch core packet processor to prompt the switch core packet processor to transmit the packet via one or more ports of the network device.

Embodiment 5: The network device of embodiment 4, wherein the hardware circuitry is configured to, for each of at least some of the packets: determine whether a time duration has reached a threshold, the time duration corresponding a time since the network device transmitted a previous packet having telemetry data; and in response to determining that the time duration has reached the threshold, provide the packet to the switch core packet processor even when a size of the packet has not reached the maximum.

Embodiment 6: The network device of embodiment 3, wherein the hardware circuitry is configured to, for each of at least some of the packets: determine whether a time duration has reached a threshold, the time duration corresponding a time since the network device transmitted a previous packet having telemetry data; and in response to determining that the time duration has reached the threshold, provide the packet to the switch core packet processor.

Embodiment 7: The network device of embodiment 6, wherein the hardware circuitry comprises a timer configured to measure the time duration, and wherein the hardware circuitry is further configured to: determine whether the time duration has reached the threshold using the timer.

Embodiment 8: The network device of any of embodiments 1-7, further comprising a central processing unit (CPU) coupled to a memory device, the CPU configured to execute machine readable instructions stored in the memory device; wherein the hardware circuitry is configured to collect the telemetry data generated by the network device without intervention by the CPU.

Embodiment 9: The network device of any of embodiments 1-7, further comprising a central processing unit (CPU) coupled to a memory device, the CPU configured to execute machine readable instructions stored in the memory device. The hardware circuitry is configured to: collect the telemetry data generated by the network device in response to prompts by the CPU, and at least one of: i) generate the packets that include the respective sets of the telemetry data without intervention by the CPU, and ii) provide the packets to the switch core packet processor without intervention by the CPU.

Embodiment 10: The network device of any of embodiments 1-7, further comprising a central processing unit (CPU) coupled to a memory device, the CPU configured to execute machine readable instructions stored in the memory device; wherein the hardware circuitry is configured to generate the packets that include the respective sets of the telemetry data without intervention by the CPU.

Embodiment 11: The network device of any of embodiments 1-7, further comprising a central processing unit (CPU) coupled to a memory device, the CPU configured to execute machine readable instructions stored in the memory device; the hardware circuitry is configured to provide the packets to the switch core packet processor without intervention by the CPU.

Embodiment 12: A method in a communication network for communicating telemetry data generated by a network device, the method comprising: collecting, by hardware circuitry of the network device, the telemetry data generated by the network device, the telemetry data providing information regarding operational status of at least one of i) the network device, and ii) one or more network links connected to the network device; generating, by the hardware circuitry, packets that include respective sets of the telemetry data collected by the hardware circuitry, the packets generated by the hardware circuitry to be addressed to a remote network device in, or communicatively coupled to, the communication network; and prompting, by the hardware circuitry, the network device to transmit the packets to the remote network device.

Embodiment 13: The method for communicating telemetry data of embodiment 12, further comprising: determining times at which to collect the telemetry data based on a timer of the hardware circuitry.

Embodiment 14: The method for communicating telemetry data of one of embodiments 12 and 13, wherein generating the packets comprises, for each of at least some of the packets: adding telemetry data to the packet, by the hardware circuitry, as telemetry data is collected by the by the hardware circuitry.

Embodiment 15: The method for communicating telemetry data of embodiment 14, wherein prompting the network device to transmit the packets comprises, for each of at least some of the packets: determining, by the hardware circuitry, whether a size of the packet has reached a maximum in connection with adding telemetry data to the packet; and in response to determining that the size of the packet has reached the maximum, prompting the network device to transmit the packet.

Embodiment 16: The method for communicating telemetry data of embodiment 15, wherein prompting the network device to transmit the packets further comprises, for each of at least some of the packets: determining, by the hardware circuitry, whether a time duration has reached a threshold, the time duration corresponding to a different between i) a time corresponding to transmission of a previous packet having telemetry data, and ii) a current time; and in response to determining that the time duration has reached the threshold, prompting the network device to transmit the packet even when a size of the packet has not reached the maximum.

Embodiment 17: The method for communicating telemetry data of any of embodiments 12-14, wherein prompting the network device to transmit the packets further comprises, for each of at least some of the packets: determining, by the hardware circuitry, whether a time duration has reached a threshold, the time duration corresponding to a different between i) a time corresponding to transmission of a previous packet having telemetry data, and ii) a current time; and in response to determining that the time duration has reached the threshold, prompting the network device to transmit the packet.

Embodiment 18: The method for communicating telemetry data of any of embodiments 12-17, wherein collecting the telemetry data generated by the network device is performed in response to prompts by a central processing unit (CPU) of the network device, the CPU configured to execute machine readable instructions stored in a memory of the network device; and wherein at least one of: i) generating the packets that include the respective sets of the telemetry data is performed without intervention by the CPU, and ii) prompting the network device to transmit the packets to the remote network device is performed without intervention by the CPU.

Embodiment 19: The method for communicating telemetry data of any of embodiments 12-17, wherein the network device includes a central processing unit (CPU) that is configured to execute machine readable instructions stored in a memory of the network device; and wherein generating the packets that include the respective sets of the telemetry data is performed without intervention by the CPU.

Embodiment 20: The method for communicating telemetry data of any of embodiments 12-17, wherein the network device includes a central processing unit (CPU) that is configured to execute machine readable instructions stored in a memory of the network device; and wherein prompting the network device to transmit the packets to the remote network device is performed without intervention by the CPU.

At least some of the various blocks, operations, and techniques described above are suitably implemented utilizing dedicated hardware, such as one or more of discrete components, an integrated circuit, an ASIC, a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as in a random access memory (RAM), a read-only memory (ROM), a solid state memory, etc. The software or firmware instructions may include machine readable instructions that, when executed by one or more processors, cause the one or more processors to perform various acts described herein.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:

a switch core packet processor having a forwarding engine configured to process packets received by the network device to determine ports of the network device via which the packets are to be forwarded, the switch core packet processor further including circuitry configured to generate telemetry data that provides information regarding operational status of at least one of i) the network device, and ii) one or more network links connected to ports of the network device; and hardware circuitry configured to:

collect telemetry data generated by the switch core packet processor, generate packets that include respective sets of the telemetry data collected by the hardware circuitry, the packets generated by the hardware circuitry being addressed to a remote network device in, or communicatively coupled to, a communication network that includes the network device, the generating of packets including for each of at least some of the packets, monitoring a size of the packet while the hardware circuitry adds telemetry data to the packet, and provide the packets to the switch core packet processor to prompt the switch core packet processor to transmit the packets to the remote network device via one or more ports of the network device, including for each packet amongst at least a subset of the at least some packets, provide the packet to the switch core packet processor to prompt the switch core packet processor to transmit the packet in response to determining that a size of the packet has reached a maximum size based on the monitoring of the size of the packet while the hardware circuitry adds telemetry data to the packet.

2. The network device of claim 1, wherein the hardware circuitry comprises a timer, and the hardware circuitry is further configured to:

determine times at which to collect the telemetry data using the timer.

3. The network device of claim 1, wherein the hardware circuitry is configured to, for each of the at least some of packets, as part of generating the packet:

add telemetry data to the packet as telemetry data is collected by the hardware circuitry.

4. The network device of claim 3, wherein the hardware circuitry is configured to, for each of at least another subset of the packets:

determine whether a time duration has reached a threshold, the time duration corresponding to a time since the network device transmitted a previous packet having telemetry data; and in response to determining that the time duration has reached the threshold, provide the packet to the switch core packet processor even when a size of the packet has not reached the maximum size.

5. The network device of claim 1, wherein the hardware circuitry is configured to, for each of at least another subset of the packets:

determine whether a time duration has reached a threshold, the time duration corresponding to a time since the network device transmitted a previous packet having telemetry data; and in response to determining that the time duration has reached the threshold, provide the packet to the switch core packet processor even when a size of the packet bas not reached the maximum size.

6. A network device, comprising:

a switch core packet processor having a forwarding engine configured to process packets received by the network device to determine ports of the network device via which the packets are to be forwarded, the switch core packet processor further including circuitry configured to generate telemetry data that provides information regarding operational status of at least one of i) the network device, and ii) one or more network links connected to ports of the network device; and hardware circuitry configured to:

collect telemetry data generated by the switch core packet processor, generate packets that include respective sets of the telemetry data collected by the hardware circuitry, the packets generated by the hardware circuitry being addressed to a remote network device in, or communicatively coupled to, a communication network that includes the network device, the generating of the packets including, for each of at least some of the packets, adding telemetry data to the packet as telemetry data is collected by the hardware circuitry, and provide the packets to the switch core packet processor to prompt the switch core packet processor to transmit the packets to the remote network device via one or more ports of the network device, including, for each packet amongst at least a subset of the at least some packets:

determining whether a time duration has reached a threshold, the time duration corresponding to a time since the network device transmitted a previous packet having telemetry data, and in response to determining that the time duration has reached the threshold, providing the packet to the switch core packet processor.

7. The network device of claim 1, further comprising a central processing unit (CPU) coupled to a memory device, the CPU configured to execute machine readable instructions stored in the memory device;

wherein the hardware circuitry is configured to collect the telemetry data generated by the network device without intervention by the CPU.

8. The network device of claim 1, further comprising a central processing unit (CPU) coupled to a memory device, the CPU configured to execute machine readable instructions stored in the memory device;

wherein the hardware circuitry is configured to:

collect the telemetry data generated by the network device in response to prompts by the CPU, and at least one of:

generate the packets that include the respective sets of the telemetry data without intervention by the CPU, and provide the packets to the switch core packet processor without intervention by the CPU.

9. The network device of claim 1, further comprising a central processing unit (CPU) coupled to a memory device, the CPU configured to execute machine readable instructions stored in the memory device;

wherein the hardware circuitry is configured to generate the packets that include the respective sets of the telemetry data without intervention by the CPU.

10. The network device of claim 1, further comprising a central processing unit (CPU) coupled to a memory device, the CPU configured to execute machine readable instructions stored in the memory device;

the hardware circuitry is configured to provide the packets to the switch core packet processor without intervention by the CPU.

11. A method in a communication network for communicating telemetry data generated by a network device, the method comprising:

collecting, by hardware circuitry of the network device, the telemetry data generated by the network device, the telemetry data providing information regarding operational status of at least one of i) the network device, and ii) one or more network links connected to the network device;

generating, by the hardware circuitry, packets that include respective sets of the telemetry data collected by the hardware circuitry, the packets generated by the hardware circuitry to be addressed to a remote network device in, or communicatively coupled to, the communication network, the generating of packets including, for each of at least some of the packets, monitoring a size of the packet while the hardware circuitry adds telemetry data to the packet; and prompting, by the hardware circuitry, the network device to transmit the packets to the remote network device, including, for each packet amongst at least a subset of the at least some packets, providing the packet to the switch core packet processor to prompt the switch core packet processor to transmit the packet in response to determining that a size of the packet has reached a maximum size based on the monitoring of the size of the packet while the hardware circuitry adds telemetry data to the packet.

12. The method for communicating telemetry data of claim 11, further comprising:

determining times at which to collect the telemetry data based on a timer of the hardware circuitry.

13. The method for communicating telemetry data of claim 11, wherein generating the packets comprises, for each of the at least some of packets:

adding telemetry data to the packet, by the hardware circuitry, as telemetry data is collected by the hardware circuitry.

14. The method for communicating telemetry data of claim 13, wherein prompting the network device to transmit the packets further comprises, for each of at least another subset of the packets:

determining, by the hardware circuitry, whether a time duration has reached a threshold, the time duration corresponding to a difference between i) a time corresponding to transmission of a previous packet having telemetry data, and ii) a current time; and in response to determining that the time duration has reached the threshold, prompting the network device to transmit the packet even when a size of the packet has not reached the maximum size.

15. The method for communicating telemetry data of claim 11, wherein prompting the network device to transmit the packets further comprises, for each of at least another subset of the packets:

determining, by the hardware circuitry, whether a time duration has reached a threshold, the time duration corresponding to a difference between i) a time corresponding to transmission of a previous packet having telemetry data, and ii) a current time; and in response to determining that the time duration has reached the threshold, prompting the network device to transmit the packet even when a size of the packet has not reached the maximum size.

16. The method for communicating telemetry data of claim 11, wherein collecting the telemetry data generated by the network device is performed in response to prompts by a central processing unit (CPU) of the network device, the CPU configured to execute machine readable instructions stored in a memory of the network device; and wherein at least one of:

generating the packets that include the respective sets of the telemetry data is performed without intervention by the CPU; and prompting the network device to transmit the packets to the remote network device is performed without intervention by the CPU.

17. The method for communicating telemetry data of claim 11, wherein the network device includes a central processing unit (CPU) that is configured to execute machine readable instructions stored in a memory of the network device; and wherein generating the packets that include the respective sets of the telemetry data is performed without intervention by the CPU.

18. The method for communicating telemetry data of claim 11, wherein the network device includes a central processing unit (CPU) that is configured to execute machine readable instructions stored in a memory of the network device; and wherein prompting the network device to transmit the packets to the remote network device is performed without intervention by the CPU.

19. The network device of claim 6, wherein the hardware circuitry comprises a timer configured to measure the time duration, and wherein the hardware circuitry is further configured to:

determine whether the time duration has reached the threshold using the timer.

20. A method in a communication network for communicating telemetry data generated by a network device, the method comprising:

collecting, by hardware circuitry of the network device, the telemetry data generated by the network device, the telemetry data providing information regarding operational status of at least one of i) the network device, and ii) one or more network links connected to the network device;

generating, by the hardware circuitry, packets that include respective sets of the telemetry data collected by the hardware circuitry, the packets generated by the hardware circuitry to be addressed to a remote network device in, or communicatively coupled to, the communication network, the generating of the packets including, for each of at least some of the packets, adding telemetry data to the packet as telemetry data is collected by the hardware circuitry; and prompting, by the hardware circuitry, the network device to transmit the packets to the remote network device, including, for each packet amongst at least a subset of the at least some packets:

determining whether a time duration has reached a threshold, the time duration corresponding to a time since the network device transmitted a previous packet having telemetry data, and in response to determining that the time duration has reached the threshold, providing the packet to the switch core packet processor.

* * * * *